(12) United States Patent
Stein et al.

(10) Patent No.: US 7,245,449 B2
(45) Date of Patent: Jul. 17, 2007

(54) TIMING ANALYSIS OF READ BACK SIGNALS IN MAGNETIC RECORDING DEVICES

(75) Inventors: Anatoli Stein, Atherton, CA (US); Semen P. Volfbeyn, Milpitas, CA (US); Vladislav A. Klimov, San Jose, CA (US); Igor Tarnikov, Palo Alto, CA (US)

(73) Assignee: Guzik Technical Enterprises, Mountain View, CA (US)

( * ) Notice: Subject to any disclaimer, the term of this patent is extended or adjusted under 35 U.S.C. 154(b) by 0 days.

(21) Appl. No.: 11/249,042

(22) Filed: Oct. 11, 2005

(65) Prior Publication Data
US 2007/0025004 A1 Feb. 1, 2007

Related U.S. Application Data (60) Provisional application No. 60/704,244, filed on Jul. 28, 2005.

(51) Int. Cl.
*G11B 5/35* (2006.01)

(52) U.S. Cl. .......................... 360/65; 360/31; 360/51; 360/39

(58) Field of Classification Search ..................... None
See application file for complete search history.

(56) References Cited

U.S. PATENT DOCUMENTS

| | | | | |
|---|---|---|---|---|
| 5,490,091 A | * | 2/1996 | Kogan et al. | 702/180 |
| 5,872,819 A | * | 2/1999 | Carsello et al. | 375/355 |
| 5,999,355 A | * | 12/1999 | Behrens et al. | 360/65 |
| 6,650,718 B1 | * | 11/2003 | Fujimura et al. | 375/355 |
| 6,674,592 B2 | * | 1/2004 | Shimoda | 360/51 |
| 6,738,205 B1 | * | 5/2004 | Moran et al. | 360/17 |
| 6,747,826 B2 | * | 6/2004 | Ohta et al. | 360/51 |
| 2004/0071232 A1 | * | 4/2004 | de Souza et al. | 375/341 |
| 2005/0094754 A1 | * | 5/2005 | Serizawa | 375/350 |
| 2005/0117681 A1 | * | 6/2005 | Lee | 375/376 |
| 2005/0286649 A1 | * | 12/2005 | Redfern | 375/260 |

* cited by examiner

*Primary Examiner*—Andrea Wellington
*Assistant Examiner*—Dismery Mercedes
(74) *Attorney, Agent, or Firm*—Van Pelt, Yi & James LLP (57) ABSTRACT

Analysis of a read back signal in a magnetic recording device is disclosed. The read back signal is converted to a digital read back signal, and a low frequency component of the digital read back signal is restored. A sample clock is recovered from the restored digital read back signal, and the restored digital read back signal is averaged using the recovered sample clock. A timing error is calculated based at least in part on the averaged restored digital read back signal.

32 Claims, 6 Drawing Sheets

TIMING ANALYSIS OF READ BACK SIGNALS IN MAGNETIC RECORDING DEVICES

CROSS REFERENCE TO OTHER APPLICATIONS

This application claims priority to U.S. Provisional Patent Application No. 60/704,244 entitled TIMING ANALYSIS OF READ BACK SIGNALS IN MAGNETIC RECORDING DEVICES filed Jul. 28, 2005, which is incorporated herein by reference for all purposes.

BACKGROUND OF THE INVENTION

Magnetic storage system read back signals suffer from several types of distortion including frequency instability (caused by rotation or media speed instability), non-additive media noise, additive system noise, low frequency distortion from a read back amplifier, and amplitude modulation (caused by inhomogeneous media, disk media runout, read head fly height dynamics, and tracking dynamics). Simple analysis of read back signals where they are displayed on oscilloscopes or composed into histograms using a time interval analyzer do not allow the distortion sources to be removed or separately analyzed. It would be beneficial to be able to analyze read back signals and determine the magnitude of each distortion and somehow separate the different sources for distortions.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Timing analysis of read back signals in magnetic recording devices is disclosed. Analysis for a read back signal in a magnetic recording device includes converting the read back signal to a digital read back signal and restoring a low frequency component of the pattern to the digital read back signal. Analysis also includes recovering a sample clock from the restored digital read back signal, averaging the restored digital read back signal using the recovered sample clock, and calculating a timing error based at least in part on the averaged restored digital read back signal. Several different metrics are calculated using combinations of averaged and non-averaged results allowing better understanding of the magnetic recording system's characteristics.

Figure 1:
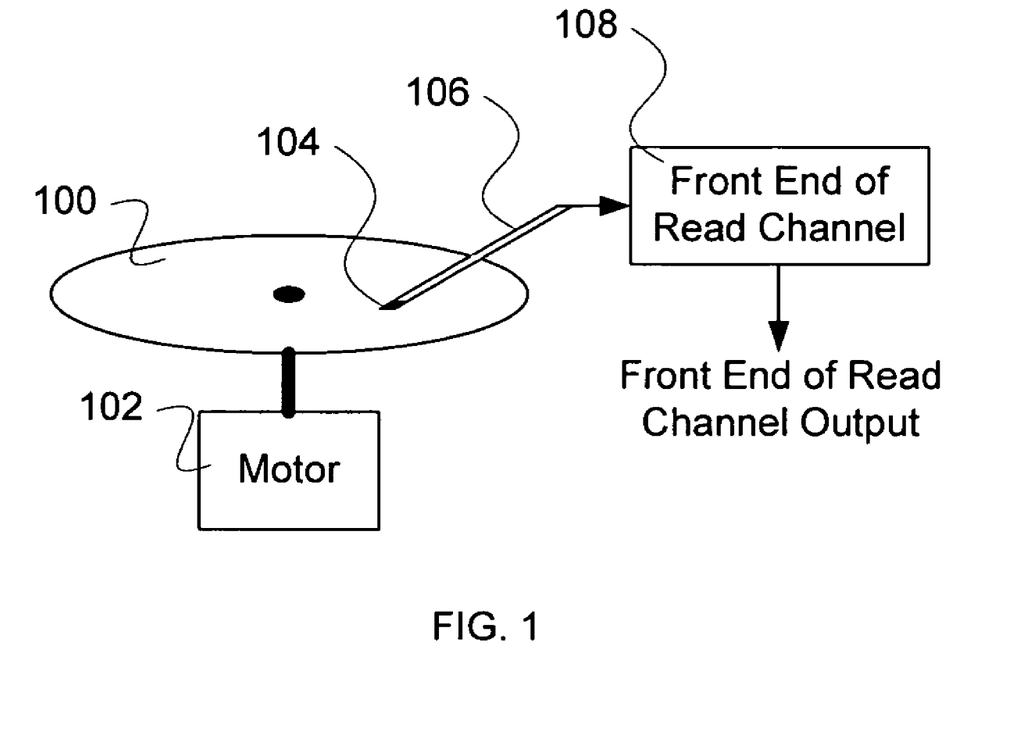
FIG. 1 is a block diagram illustrating an embodiment of a magnetic recording system.

FIG. 1 is a block diagram illustrating an embodiment of a magnetic recording system. In the example shown, magnetic disk 100 is spun using motor 102. The magnetic media on the magnetic disk 100 is read by and written to using magnetic head 104. Magnetic head 104 is positioned over magnetic disk 100 using arm 106. Arm 106 positions magnetic head 104 over the correct radial position, or the correct track on magnetic disk 100, as well as the correct height above magnetic disk 100, or the correct fly height. The read signal from magnetic head 104 is processed by front end of read channel 108 which includes circuits such as amplifiers and filters to prepare the signal for the read decoding. In some embodiments, the magnetic recording system is a tape system where the magnetic media is on a long substrate that is wound around reels or spindles and which is guided over a magnetic tape head that reads and writes to tracks on the magnetic media on the tape.

Figure 2:
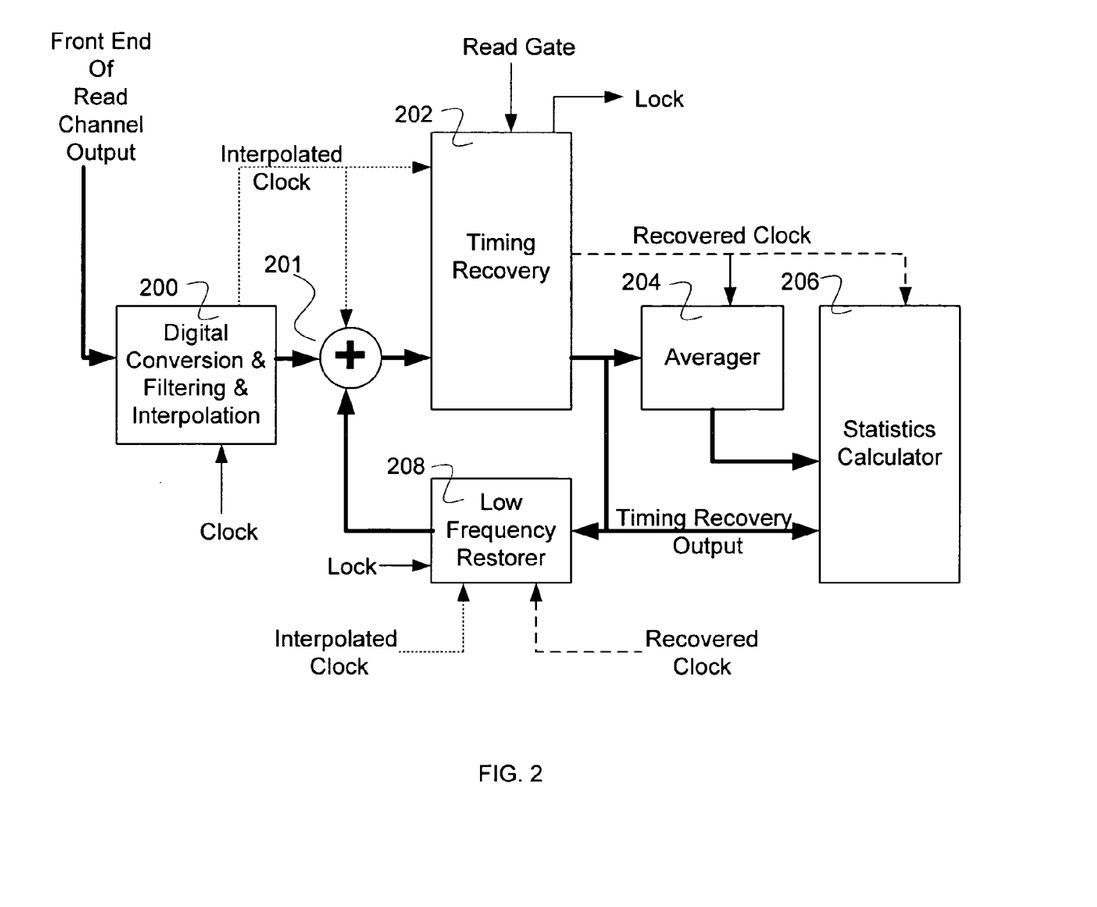
FIG. 2 is a block diagram illustrating an embodiment of a circuit for analyzing read back signals of a magnetic recording system.

FIG. 2 is a block diagram illustrating an embodiment of a circuit for analyzing read back signals of a magnetic recording system. In the example shown, the read back signal that is the output of the front end of the read channel is input to digital conversion & filtering & interpolation 200. Digital conversion & filtering & interpolation 200 also has as input a clock. The input clock is used in the process of converting the read back signal to a digital signal. After converting the signal into a digital signal, the signal is interpolated to a higher frequency clock to enable better analysis. Digital conversion & filtering & interpolation 200 has as outputs an interpolated clock and a digitized read signal.

The digitized read signal output of digital conversion & filtering & interpolation 200 is summed at summing node 201 with the output of low frequency restorer 208. Summing node 201 also has as input the interpolated clock. The output of summing node 201 is input to timing recovery 202. Timing recovery 202 also has as inputs the interpolated clock from 200 and a read gate. The read gate indicates when timing recovery of the signal should occur. Timing recovery 202 recovers a clock that is synchronized to the read back signal from the magnetic media. The clock that is synchronized to the read back signal so that it will not suffer from low-bandwidth frequency drifts associated with speed variations of the motor and/or disk, slow drifts of the clock used in the writing of the data on the disk, or radial variations of the track on the disk. Timing recovery 202 has as outputs a lock signal, a recovered clock, and a digitized read back signal that is synchronized to the recovered clock.

Low frequency restorer 208 has as inputs the outputs of timing recovery 202—the lock signal, the recovered clock, and the digitized read back signal that is synchronized to the recovered clock—as well as the interpolated clock that is output from digital conversion & filtering & interpolation 200. Low frequency restorer 208 creates a signal that can be used to restore the low frequency components of the read back signal that were lost due to the high pass filtering of the front end of the read channel as well as the high pass filtering in digital conversion & filtering & interpolation 200. In some embodiments, low frequency restorer calculates the low frequency components of a pattern's read back signal, multiplies these low frequency components by the amplitude modulation measured, or detected, in the read back signal, and the resulting signal is summed with the output of digital conversion & filtering & interpolation 200. Low frequency restorer 208 has as output a signal that is input to summing node 201.

Averager 204 has as inputs the digitized read back signal that is synchronized to the recovered clock and the recovered clock that are output from timing recovery 202. Averager 204 averages the read back signal. Averaging of the read back signal is selectable, and the types of averaging, also selectable, that can be performed include averaging the read back signals from similar patterns within a sector, by averaging the read back signals from similar patterns in different sectors around the disc, or by averaging the same pattern at one location on the disc. In some embodiments averaging comprises averaging a plurality of read back signals from the same position on a disk obtained on multiple reads of the position on the disk. In some embodiments, averaging comprises averaging a plurality of read back signals from a plurality of positions on a disk to which an identical pattern or portion thereof were written. In some embodiments, writing an identical pattern comprises applying an identical writing pattern to the disk. In some embodiments, the pattern within a sector that is averaged is a pattern that is 2–5 μs long in time when read back. In some embodiments, the pattern that is a sector long that is averaged is a pattern that is 10–20 μs long when read back. In some embodiments, the time for one revolution of the disc is 5 ms. Averager 204 outputs the results of its averaging to statistics calculator 206.

Statistics calculator 206 has as inputs the digitized read back signal that is synchronized to the recovered clock and the recovered clock that are output from timing recovery 202 and the output of averager 204. Statistics calculator 206 calculates an eye diagram for viewing the quality of a read back signal where an eye diagram is a number of superimposed read back signals that are aligned at their start by a trigger point. The trigger points are the recovered clock positions from recovering the clock in timing recovery 202. The eye diagram is similar to the pattern of the read signal that is viewed on an oscilloscope when the viewed signal is triggered on a positive or negative edge. The eye diagram of the read back signal can be calculated, or built, with averaging or without averaging. Statistics calculator 206 may show an eye diagram with low frequency amplitude distortions removed, with some signal averaging, or with timing distortions removed. In some embodiments, building an eye diagram comprises resampling the digital read back signal using the recovered sample clock to provide for the same number, or a similar number, of samples in each of the bit clocks, or bins for each bit clock, in order to try to achieve a uniform distribution. In some embodiments, building an eye diagram comprises averaging the resampled digital read back signal over a plurality of positions on a disk to which an identical pattern or a portion of an identical pattern was written. Statistics calculator 206 also calculates a number of metrics including composite transition shift, pattern dependent transition shift, random transition shift, media noise dependent transition shift, and precompensation dependent transition shift. Statistics calculator 206 can also use these metrics as the basis for further statistical metrics (for example, average shifts, standard deviations of the shift, etc.).

The composite transition shift is the time shift between the position of an edge of the read back signal and the nearest edge of the recovered clock. The pattern dependent transition shift is the composite transition shift averaged over a plurality of different locations on a disk where identical patterns were written. The random transition shift is the difference between the composite transition shift and the pattern dependent transition shift. The media noise transition shift is the difference between the composite transition shift averaged over a plurality of readings of a pattern from the same location on a disk and the pattern dependent transition shift. The precompensation dependent transition shift is the pattern dependent transition shift at the positions where a precompensated pattern was written on a disk.

In various embodiments, the processing of the blocks in FIG. 2 is done using dedicated hardware implementations (for example, discrete mixed signal, digital, and analog hardware), a mix of programmable and dedicated hardware implementations (for example, a mix of FPGA's—field programmable gate arrays, PGA's—programmable gate arrays, and/or DSP's—digital signal processors and discrete mixed signal, digital, and analog hardware), mostly programmable hardware implementations (for example, some discrete mixed signal hardware, like an ADC—analog to digital converter, and programmable hardware implementations), or mostly software implementations (for example, some discrete mixed signal hardware, like an ADC—analog to digital converter, and software implementations).

Figure 3:
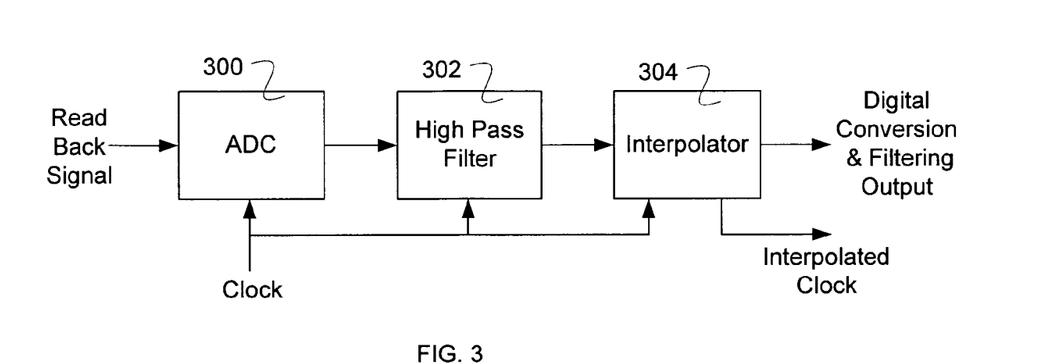
FIG. 3 is a block diagram illustrating an embodiment of digital conversion & filtering & interpolation.

FIG. 3 is a block diagram illustrating an embodiment of digital conversion and filtering. In some embodiments, the block diagram of FIG. 3 is used to implement 200 of FIG. 2. ADC 300 is an analog to digital converter. ADC 300 has as inputs a read back signal and a clock. The read back signal is the output signal of the front end of the read channel (for example, front end of read channel 108) that is connected to or a part of the read head (for example, magnetic read head 104). In some embodiments, ADC 300 includes the components necessary to convert the analog signal that is input to a digital signal including an anti-aliasing filter and an analog-to-digital conversion circuit (for example, a flash or successive approximation type analog to digital conversion circuit) as well as any other appropriate components. The input clock frequency to ADC 300 is chosen so that ADC 300 has the desired fidelity and cost required for the system. In some embodiments, the read back signal bandwidth is 2.5 GHz and the clock used for sampling ADC 300 is 10 GHz.

The output of ADC 300 is an input to high pass filter 302. High pass filter 302 also has as input a clock. High pass filter 302 has its cutoff frequency higher than any other high pass cutoff for the read back signal up to that point from the magnetic read head. High pass filter 302 therefore characterizes the low frequency response of the system. This allows the low frequency restorer to restore all of the frequencies below high pass filter 302 cutoff. In some embodiments, high pass filter 302 cutoff frequency is in the range of 2–3 MHz The output of high pass filter 302 is an input to interpolator 304. Interpolator 304 also has as input ADC 300 sampling clock. Interpolator 304 increases the frequency of the digital samples in time to allow finer time shift measurements of the read back signal. The magnetic recording system has an overall frequency response to the read back signal such that linearly interpolating samples can be an acceptable design trade-off to achieve high precision timing shift measurements and also lower component cost (e.g. very high speed analog to digital converters are very costly). The amplitude values of the signal are interpolated for the newly inserted time samples. In various embodiments, the interpolation is linear, $2^{nd}$ order polynomial, or spline interpolation, or any other appropriate interpolation. In some embodiments, the interpolator increases the sampling frequency by a factor of up to 10. The output of Interpolator 304 is the output of digital conversion & filtering & interpolation and an interpolated clock.

Figure 4:
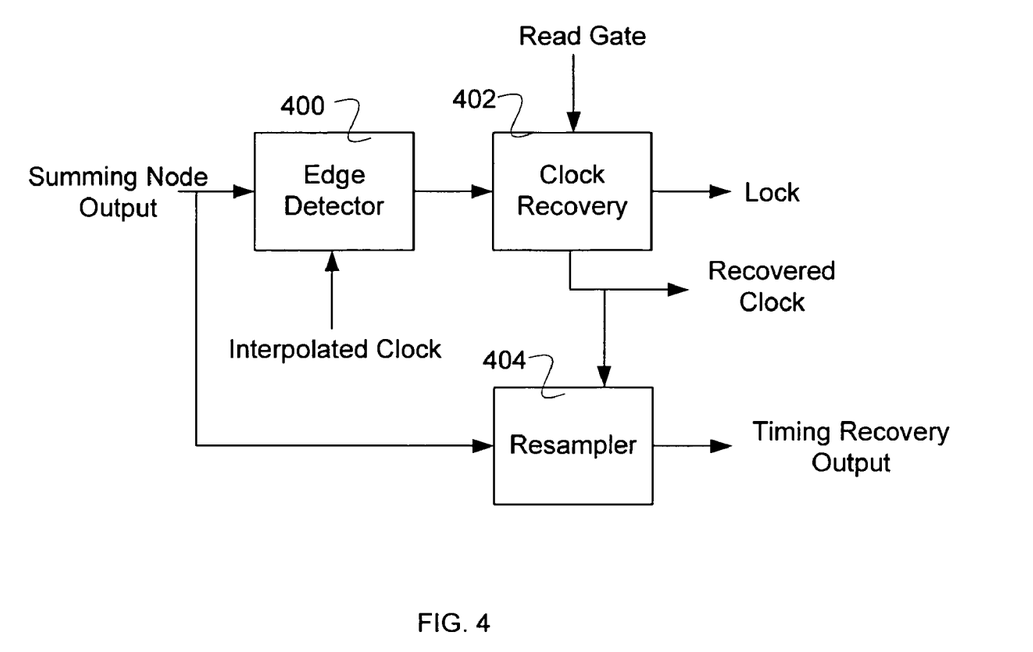
FIG. 4 is a block diagram illustrating an embodiment of timing recovery.

FIG. 4 is a block diagram illustrating an embodiment of timing recovery. In some embodiments, the block diagram of FIG. 4 is used to implement 202 of FIG. 2. Edge detector 400 has as input a low frequency corrected digitized version of a read back signal and an interpolated clock. In some embodiments, the summing node output that is input to edge detector 400 is the output of summing node 201 of FIG. 2. Edge detector 400 detects the time at which the input signal crosses a threshold or a zero when signals are bipolar and probably swing symmetrically around zero. Edge detector 400 may use a simple zero crossing detector, simple threshold detector with programmable threshold, a threshold detector with hysteresis, complex threshold detector requiring the signal pass two thresholds before an edge is declared, or any other appropriate threshold detector. The times at which the edge detector detects a read back signal edge are input to clock recovery 402. In some embodiments, edges are detected using a pattern matching, a correlation, or any other appropriate method for finding edge locations.

Clock recovery 402 locks a clock to the times at which the edges of the read back signal appear. The read back signal will have edges that correspond to selected clock edges. The differences between the read back signal edge and the corresponding clock edge (transition shifts) are used to drive a phase lock loop, delay lock loop, or any other appropriate clock locking or timing recovery circuit. By locking a clock to the read back signal and resampling the read signal according to the recovered clock, low frequency distortion in the read back signal is removed. Clock recovery 402 also has as input a read gate that indicates when the clock recovery unit is locking a clock to the input read back signal. Clock recovery 402 has as output a lock signal that indicates when the clock recovery unit is locked to the signal. Resampler 404 has as input the output of the summing node. Resampler 404 resamples the input signal based on the recovered clock and outputs the resampled signal as its output. In various embodiments, the resampled signal is resampled at a frequency equal to the recovered clock or at a multiple of the recovered clock. In some embodiments, a special periodic signal, which precedes the testing pattern, is used to obtain the clock recovery lock. In some embodiments, this periodic signal is referred to as the preamble.

Figure 5:
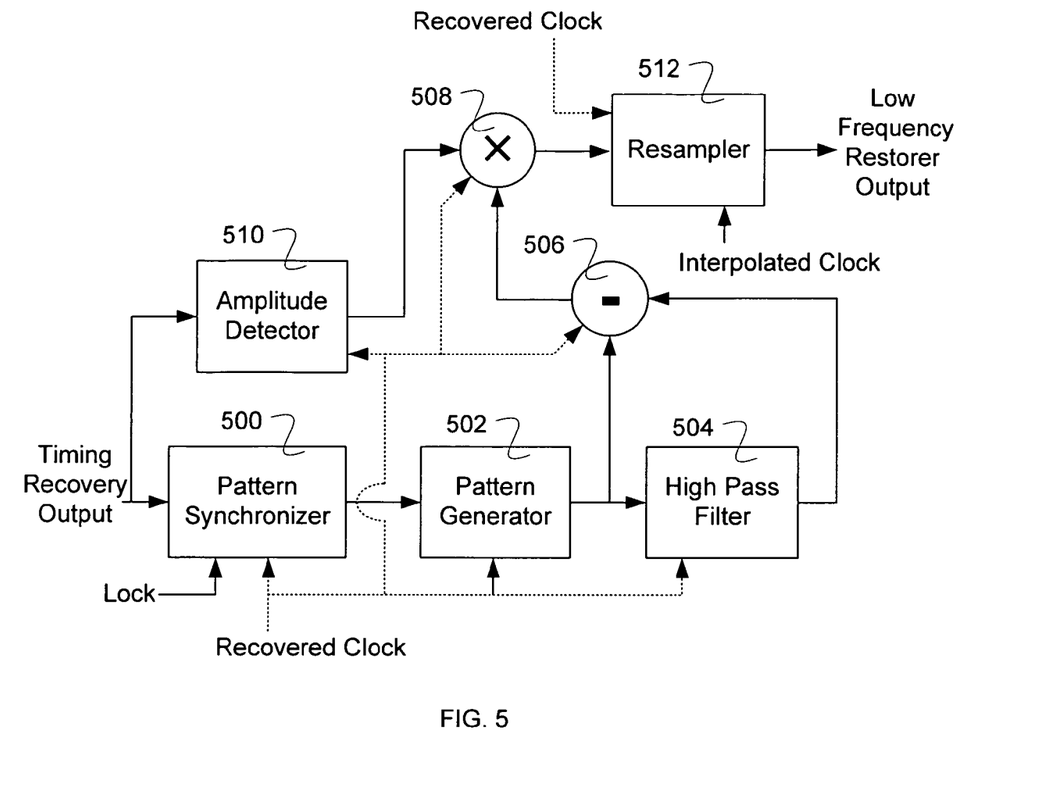
FIG. 5 is a block diagram illustrating an embodiment of a low frequency restorer.

FIG. 5 is a block diagram illustrating an embodiment of a low frequency restorer. In some embodiments the block 206 of FIG. 2 is implemented using the block diagram of FIG. 5. Timing recovery output signal is input to pattern synchronizer 500. Pattern synchronizer 500 synchronizes to the read back signal and sends a signal to pattern generator 502 to enable pattern generator 502 to output, in a synchronized manner, the idealized read back signal pattern. Pattern synchronizer 500 also has as inputs a lock signal and a recovered clock. The lock signal is used by pattern synchronizer 500 to determine when to be looking to synchronize to the input signal. The recovered clock signal allows pattern synchronizer 500 to look at the correct samples in the timing recovery output signal. In some embodiments, pattern synchronizer looks for a pattern at the start of fixed testing pattern. In some embodiments, the pattern at the start of fixed testing pattern is referred to as the address mark. In this case, the pattern synchronizer can also be referred to as the address mark detector. Pattern synchronizer outputs a synchronizing signal to pattern generator 502.

Pattern generator 502 outputs an ideal full bandwidth read back signal pattern where full bandwidth includes low frequencies that are filtered as part of the detection process or read channel processing. Pattern generator 502 synchronizes its own pattern generation by using input signal from pattern synchronizer 500. Pattern generator 502 also has as input recovered clock to allow its output signal to be synchronized to the recovered clock. Pattern generator 502 outputs are passed to high pass filter 504 and summing node 506. High pass filter 504 removes high frequency components of the ideal read back signal generated by pattern generator 502. High pass filter 504 is designed to produce the same filtered characteristics as the read channel processes. In some embodiments, high pass filter 504 is identical to high pass filter 302 in FIG. 3. High pass filter 504 also has as input the recovered clock to use to synchronously process the input signal with the recovered clock. The output of high pass filter 504 is designed to be the ideal read back signal as seen after the high pass filtering and interpolation at the output of 302, when the ideal non-distorted read back signal is supplied at the input of ADC 300. The output of high pass filter 504 is subtracted from full bandwidth ideal read signal pattern at summing node 506. Summing node 506 also has as input the recovered clock to use to synchronously process the input signals with the recovered clock. The output of summing node 506 is the ideal low frequency portion of the ideal read back signal. This signal is used to restore the low frequency signal in the actual read back signal. The output of summing node 506 is sent to scaling node 508, which scales the signal by an appropriate amplitude where the appropriate amplitude is determined by amplitude detector 510. Amplitude detector 510 has as inputs the timing recovery output signal and the recovered clock. Amplitude detector produces an output signal sent to scaling node 508 indicating the amplitude scaling appropriate for the ideal low frequency signal output from summing node 506. Scaling node 508 also has as input the recovered clock to use to synchronously process the input signals with the recovered clock. Scaling node 508 output signal is sent to resampler 512 which resamples the signal from the resampled clock to the appropriate clock to be summed back into the actual read back signal, the interpolated clock. In some embodiments, the appropriate clock to be summed back into the actual read back signal is the interpolated clock that is produced by block 304 of FIG. 3. In some embodiments, the summing back to the actual read back signal is in the recovered clock domain. Resampler 512 also has as inputs recovered clock and interpolated clock in order to process signals synchronous to these clocks. Output of resampler is the output of the low frequency restorer. Low frequency output is sent to summing node 201 in FIG. 2.

Figure 6:
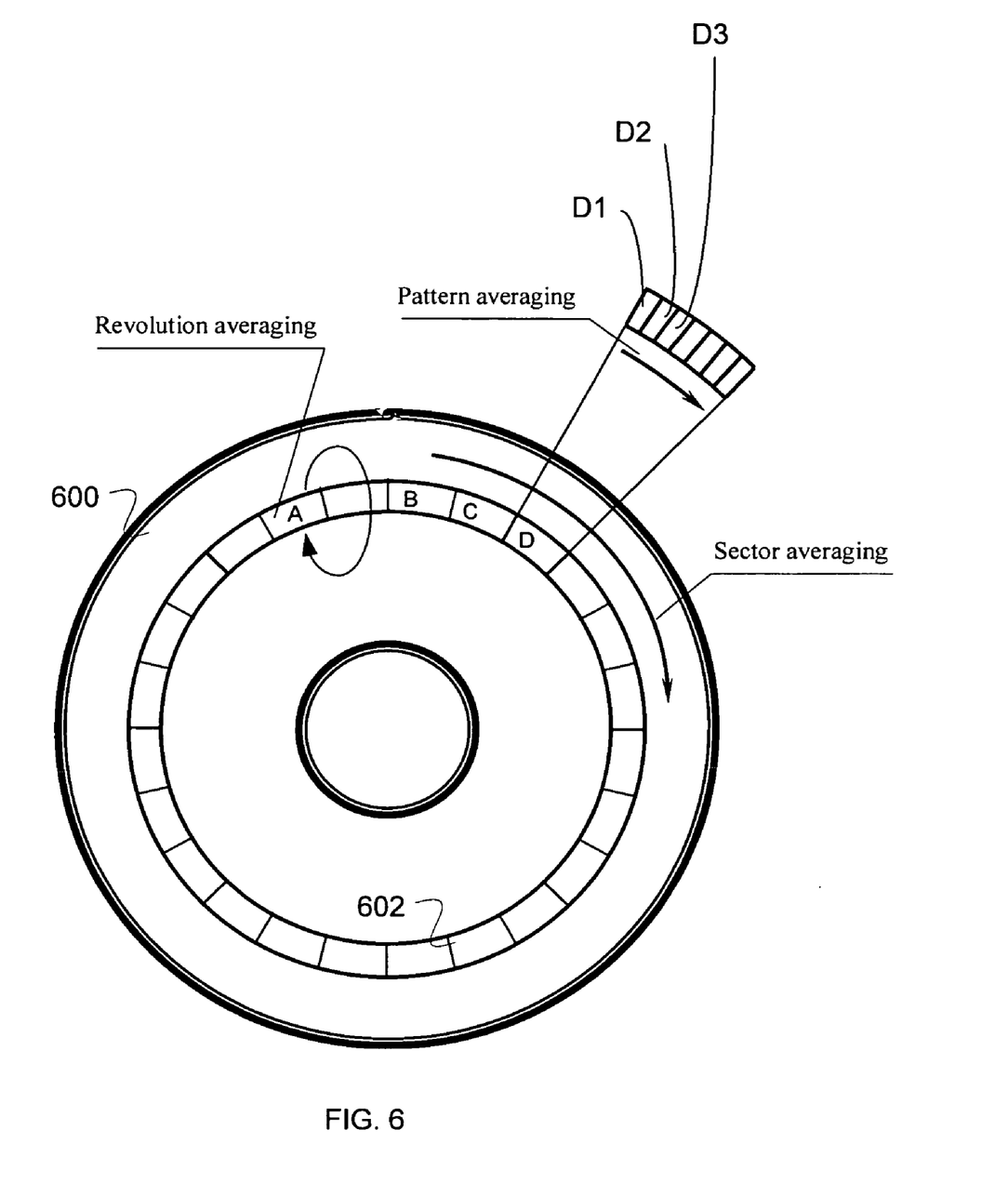
FIG. 6 illustrates patterns on a disk that can be used during averaging in one embodiment.

FIG. 6 illustrates patterns on a disk that can be used during averaging in one embodiment. In the example shown, disk 600 comprises a substrate on which there is a magnetic recording material. Data and/or test patterns are written on to disk 600 in a plurality of tracks. Track 602 contains regions of data and/or test patterns. In some embodiments, regions of a track are referred to as sectors. Track 602 is segmented in to a plurality of sectors. Sectors A, B, C, and D have been labeled as representative of all the other sectors in a track. Signal averaging can average signal readings from the same location in the disk, for example sector A is read multiple times and the values corresponding to the same locations on the disc are averaged together (revolution averaging). Revolution averaging eliminates noise sources that vary if a sector is read at different times—electronic noise in the read channel, random read head fly height variation, random read head tracking offsets, random motor speed variation, etc. Signal averaging can average signal readings from different locations of the disk, for example if sectors A, B, C, D, . . . etc. have the same pattern written in them, the signals read from the different sectors can be aligned and averaged together (sector averaging). Sector averaging eliminates noise sources that vary if the same pattern is read in different sectors—disk media variation, electronic noise in the read channel, random and systematic read head fly height variations, random and systematic read head tracking offsets, random and systematic motor speed variations, etc. Signal averaging can average signal readings from different close by locations of the disk, for example if subsections of a sector D1, D2, D3, . . . etc. have the same pattern written in them, the signals read from the different subsections of a sector can be aligned and averaged together (pattern averaging). Pattern averaging eliminates noise sources that vary if the same pattern is read in different subsections of a sector—disk media variation, electronic noise in the read channel, random read head fly height variations, random read head tracking offsets, random motor speed variations, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of analysis for a read back signal in a magnetic recording device including:
   converting the read back signal to a digital read back signal;
   restoring a low frequency component of the digital read back signal, wherein restoring the low frequency component of the digital read back signal includes detecting a digital read back signal amplitude and multiplying a difference between a signal pattern and a high pass filtered version of the signal pattern by the digital read back signal amplitude;
   recovering a sample clock from the restored digital read back signal;
   averaging the restored digital read back signal using the recovered sample clock; and
   calculating a timing error based at least in part on the averaged restored digital read back signal.

2. A method of analysis for a read back signal in a magnetic recording device including:
   converting the read back signal to a digital read back signal;
   restoring a low frequency component of the digital read back signal, wherein restoring the low frequency component of the digital read back signal includes adding a difference between a signal pattern and a high pass filtered version of the signal pattern multiplied by a digital read back signal amplitude to the digital read back signal;
   recovering a sample clock from the restored digital read back signal;
   averaging the restored digital read back signal using the recovered sample clock; and
   calculating a timing error based at least in part on the averaged restored digital read back signal.

3. A method of analysis for a read back signal in a magnetic recording device including:
   converting the read back signal to a digital read back signal;
   restoring a low frequency component of the digital read back signal;
   recovering a sample clock from the restored digital read back signal, wherein recovering a sample clock includes detecting a read back signal edge position in the digital read back signal and using a phase lock loop to lock a sample clock to a plurality of read back signal edge positions to generate a sample clock;
   averaging the restored digital read back signal using the recovered sample clock; and
   calculating a timing error based at least in part on the averaged restored digital read back signal.

4. A method of analysis for a read back signal in a magnetic recording device including:
   converting the read back signal to a digital read back signal;
   restoring a low frequency component of the digital read back signal:
   recovering a sample clock from the restored digital read back signal:
   averaging the restored digital read back signal using the recovered sample clock, wherein averaging comprises averaging a plurality of read back signals from a plurality of positions on a disk to which an identical pattern or portion of an identical pattern was written; and
   calculating a timing error based at least in part on the averaged restored digital read back signal.

5. A method of analysis for a read back signal in a magnetic recording device including:
   converting the read back signal to a digital read back signal;
   restoring a low frequency component of the digital read back signal;
   recovering a sample clock from the restored digital read back signal;
   averaging the restored digital read back signal using the recovered sample clock, wherein averaging comprises averaging a plurality of read back signals from the same position on a disk obtained on multiple reads; and
   calculating a timing error based at least in part on the averaged restored digital read back signal.

6. A method of analysis for a read back signal in a magnetic recording device including:
   converting the read back signal to a digital read back signal;

restoring a low frequency component of the digital read back signal;

recovering a sample clock from the restored digital read back signal;

averaging the restored digital read back signal using the recovered sample clock; and calculating a timing error based at least in part on the averaged restored digital read back signal, wherein the timing error calculation comprises calculating a composite transition shift by subtracting a read back signal edge position from a closest recovered clock position.

7. A method of analysis for a read back signal in a magnetic recording device including:

converting the read back signal to a digital read back signal;

restoring a low frequency component of the digital read back signal;

recovering a sample clock from the restored digital read back signal;

averaging the restored digital read back signal using the recovered sample clock; and calculating a timing error based at least in part on the averaged restored digital read back signal, wherein the timing error calculation comprises calculating a pattern dependent transition shift by averaging a composite transition shift over a plurality of positions on a disk where an identical pattern or a portion of an identical pattern was written, wherein the composite transition shift is calculated by subtracting a read back signal edge position from a closest recovered clock position.

8. A method of analysis for a read back signal in a magnetic recording device including:

converting the read back signal to a digital read back signal;

restoring low frequency component of the digital read back signal;

recovering a sample clock from the restored digital read back signal;

averaging the restored digital read back signal using the recovered sample clock; and calculating a timing error based at least in part on the averaged restored digital read back signal, wherein the timing error calculation comprises calculating a random transition shift by subtracting a pattern dependent transition shift from a composite transition shift, wherein the composite transition shift is calculated by subtracting a read back signal edge position from a closest recovered clock position and wherein the pattern dependent transition shift is calculated by averaging the composite transition shift over a plurality of positions on a disk where an identical pattern or a portion of an identical pattern was written.

9. A method of analysis for a read back signal in a magnetic recording device including:

converting the read back signal to a digital read back signal;

restoring a low frequency component of the digital read back signal;

recovering a sample clock from the restored digital read back signal;

averaging the restored digital read back signal using the recovered sample clock; and calculating a timing error based at least in part on the averaged restored digital read back signal, wherein the timing error calculation comprises calculating a media noise dependent transition shift by calculating the difference between a composite transition shift averaged over a plurality of read back signals from the same position on a disk and a pattern dependent transition shift, wherein the composite transition shift is calculated by subtracting a read back signal edge position from a closest recovered clock position and wherein the pattern dependent transition shift is calculated by averaging the composite transition shift over a plurality of positions on a disk where an identical pattern or a portion of an identical pattern was written.

10. A method of analysis for a read back signal in a magnetic recording device including:

converting the read back signal to a digital read back signal;

restoring a low frequency component of the digital read back signal;

recovering a sample clock from the restored digital read back signal;

averaging the restored digital read back signal using the recovered sample clock; and calculating a timing error based at least in part on the averaged restored digital read back signal, wherein the timing error calculation comprises calculating a precompensation dependent transition shift by averaging a composite transition shift over a plurality of positions on a disk where an identical precompensated pattern or a portion of an identical precompensated pattern was written, wherein the composite transition shift is calculated by subtracting a read back signal edge position from a closest recovered clock position.

11. A method of analysis for a read back signal in a magnetic recording device including:

converting the read back signal to a digital read back signal;

restoring a low frequency component of the digital read back signal;

recovering a sample clock from the restored digital read back signal;

averaging the restored digital read back signal using the recovered sample clock;

calculating a timing error based at least in part on the averaged restored digital read back signal; and building an eve diagram of the read back signal, wherein building an eye diagram comprises averaging the resampled digital read back signal over a plurality of positions on a disk to which an identical pattern or a portion of an identical pattern was written.

12. A system of analysis for a read back signal in a magnetic recording device including:

a converter to convert the read back signal to a digital read back signal;

a restorer to restore a low frequency component of the digital read back signal;

a recoverer to recover a sample clock from the restored digital read back signal;

an averager to average the restored digital read back signal using the recovered sample clock; and a calculator to calculate a timing error based at least in part on the averaged restored digital read back signal, wherein the timing error calculation comprises calculating a composite transition shift by subtracting a read back signal edge position from a closest recovered clock position.

13. A system of analysis for a read back signal in a magnetic recording device including:

a converter to convert the read back signal to a digital read back signal;

a restorer to restore a low frequency component of the digital read back signal;

a recoverer to recover a sample clock from the restored digital read back signal;

an averager to average the restored digital read back signal using the recovered sample clock; and a calculator to calculate a timing error based at least in part on the averaged restored digital read back signal, wherein the timing error calculation comprises calculating a pattern dependent transition shift by averaging a composite transition shift over a plurality of positions on a disk where an identical pattern or a portion of an identical pattern was written, wherein the composite transition shift is calculated by subtracting a read back signal edge position from a closest recovered clock position.

14. A system of analysis for a read back signal in a magnetic recording device including:

a converter to convert the read back signal to a digital read back signal;

a restorer to restore a low frequency component of the digital read back signal;

a recoverer to recover a sample clock from the restored digital read back signal;

an averager to average the restored digital read back signal using the recovered sample clock; and a calculator to calculate a timing error based at least in part on the averaged restored digital read back signal, wherein the timing error calculation comprises calculating a random transition shift by subtracting a pattern dependent transition shift from a composite transition shift, wherein the composite transition shift is calculated by subtracting a read back signal edge position from a closest recovered clock position and wherein the pattern dependent transition shift is calculated by averaging the composite transition shift over a plurality of positions on a disk where an identical pattern or a portion of an identical pattern was written.

15. A system of analysis for a read back signal in a magnetic recording device including:

a converter to convert the read back signal to a digital read back signal;

a restorer to restore a low frequency component of the digital read back signal;

a recoverer to recover a sample clock from the restored digital read back signal;

an averager to average the restored digital read back signal using the recovered sample clock; and a calculator to calculate a timing error based at least in part on the averaged restored digital read back signal, wherein the timing error calculation comprises calculating a media noise dependent transition shift by calculating the difference between a composite transition shift averaged over a plurality of read back signals from the same position on a disk and a pattern dependent transition shift, wherein the composite transition shift is calculated by subtracting a read back signal edge position from a closest recovered clock position and wherein the pattern dependent transition shift is calculated by averaging the composite transition shift over a plurality of positions on a disk where an identical pattern or a portion of an identical pattern was written.

16. A system of analysis for a read back signal in a magnetic recording device including:

a converter to convert the read back signal to a digital read back signal;

a restorer to restore a low frequency component of the digital read back signal;

a recoverer to recover a sample clock from the restored digital read back signal;

an averager to average the restored digital read back signal using the recovered sample clock; and a calculator to calculate a timing error based at least in part on the averaged restored digital read back signal, wherein the timing error calculation comprises calculating a precompensation dependent transition shift by averaging a composite transition shift over a plurality of positions on a disk where an identical precompensated pattern or a portion of an identical precompensated pattern was written, wherein the composite transition shift is calculated by subtracting a read back signal edge position from a closest recovered clock position.

17. A system of analysis for a read back signal in a magnetic recording device including:

a converter to convert the read back signal to a digital read back signal;

a restorer to restore a low frequency component of the digital read back signal;

a recoverer to recover a sample clock from the restored digital read back signal;

an averager to average the restored digital read back signal using the recovered sample clock;

a calculator to calculate a timing error based at least in part on the averaged restored digital read back signal; and a builder to build an eye diagram of the read back signal, wherein building an eye diagram comprises averaging the resampled digital read back signal over a plurality of positions on a disk to which an identical pattern or a portion of an identical pattern was written.

18. A computer program product for analysis of a read back signal in a magnetic recording device, the computer program product being embodied in a computer readable medium and comprising computer instructions for:

converting the read back signal to a digital read back signal;

restoring a low frequency component of the digital read back signal;

recovering a sample clock from the restored digital read back signal;

averaging the restored digital read back signal using the recovered sample clock; and calculating a timing error based at least in part on the averaged restored digital read back signal, wherein the timing error calculation comprises calculating a composite transition shift by subtracting a read back signal edge position from a closest recovered clock position.

19. A computer program product for analysis of a read back signal in a magnetic recording device, the computer program product being embodied in a computer readable medium and comprising computer instructions for:

converting the read back signal to a digital read back signal;

restoring a low frequency component of the digital read back signal;

recovering a sample clock from the restored digital read back signal;

averaging the restored digital read back signal using the recovered sample clock; and calculating a timing error based at least in part on the averaged restored digital read back signal, wherein the timing error calculation comprises calculating a pattern dependent transition shift by averaging a composite transition shift over a plurality of positions on a disk where an identical pattern or a portion of an identical pattern was written, wherein the composite transition shift is calculated by subtracting a read back signal edge position from a closest recovered clock position.

20. A computer program product for analysis of a read back signal in a magnetic recording device, the computer program product being embodied in a computer readable medium and comprising computer instructions for:
converting the read back signal to a digital read back signal;
restoring a low frequency component of the digital read back signal;
recovering a sample clock from the restored digital read back signal;
averaging the restored digital read back signal using the recovered sample clock; and
calculating a timing error based at least in part on the averaged restored digital read back signal, wherein the timing error calculation comprises calculating a random transition shift by subtracting a pattern dependent transition shift from a composite transition shift, wherein the composite transition shift is calculated by subtracting a read back signal edge position from a closest recovered clock position and wherein the pattern dependent transition shift is calculated by averaging the composite transition shift over a plurality of positions on a disk where an identical pattern or a portion of an identical pattern was written.

21. A computer program product for analysis of a read back signal in a magnetic recording device, the computer program product being embodied in a computer readable medium and comprising computer instructions for:
converting the read back signal to a digital read back signal;
restoring a low frequency component of the digital read back signal;
recovering a sample clock from the restored digital read back signal;
averaging the restored digital read back signal using the recovered sample clock; and
calculating a timing error based at least in part on the averaged restored digital read back signal, wherein the timing error calculation comprises calculating a media noise dependent transition shift by calculating the difference between a composite transition shift averaged over a plurality of read back signals from the same position on a disk and a pattern dependent transition shift, wherein the composite transition shift is calculated by subtracting a read back signal edge position from a closest recovered clock position and wherein the pattern dependent transition shift is calculated by averaging the composite transition shift over a plurality of positions on a disk where an identical pattern or a portion of an identical pattern was written.

22. A computer program product for analysis of a read back signal in a magnetic recording device, the computer program product being embodied in a computer readable medium and comprising computer instructions for:
converting the read back signal to a digital read back signal;
restoring a low frequency component of the digital read back signal;
recovering a sample clock from the restored digital read back signal;
averaging the restored digital read back signal using the recovered sample clock; and
calculating a timing error based at least in part on the averaged restored digital read back signal, wherein the timing error calculation comprises calculating a pre-compensation dependent transition shift by averaging a composite transition shift over a plurality of positions on a disk where an identical precompensated pattern or a portion of an identical precompensated pattern was written, wherein the composite transition shift is calculated by subtracting a read back signal edge position from a closest recovered clock position.

23. A system of analysis for a read back signal in a magnetic recording device including:
a converter to convert the read back signal to a digital read back signal;
a restorer to restore a low frequency component of the digital read back signal, wherein restoring the low frequency component of the digital read back signal includes detecting a digital read back signal amplitude and multiplying a difference between a signal pattern and a high pass filtered version of the signal pattern by the digital read back signal amplitude;
a recoverer to recover a sample clock from the restored digital read back signal:
an averager to average the restored digital read back signal using the recovered sample clock; and
a calculator to calculate a timing error based at least in part on the averaged restored digital read back signal.

24. A system of analysis for a read back signal in a magnetic recording device including:
a converter to convert the read back signal to a digital read back signal;
a restorer to restore a low frequency component of the digital read back signal, wherein restoring the low frequency component of the digital read back signal includes adding a difference between a signal pattern and a high pass filtered version of the signal pattern multiplied by a digital read back signal amplitude to the digital read back signal;
a recoverer to recover a sample clock from the restored digital read back signal;
an averager to average the restored digital read back signal using the recovered sample clock; and
a calculator to calculate a timing error based at least in part on the averaged restored digital read back signal.

25. A system of analysis for a read back signal in a magnetic recording device including:
a converter to convert the read back signal to a digital read back signal;
a restorer to restore a low frequency component of the digital read back signal, wherein recovering a sample clock includes detecting a read back signal edge position in the digital read back signal and using a phase lock loop to lock a sample clock to a plurality of read back signal edge positions to generate a sample clock;
a recoverer to recover a sample clock from the restored digital read back signal;
an averager to average the restored digital read back signal using the recovered sample clock; and
a calculator to calculate a timing error based at least in part on the averaged restored digital read back signal.

26. A system of analysis for a read back signal in a magnetic recording device including:
a converter to convert the read back signal to a digital read back signal;

a restorer to restore a low frequency component of the digital read back signal;

a recoverer to recover a sample clock from the restored digital read back signal;

an averager to average the restored digital read back signal using the recovered sample clock, wherein averaging comprises averaging a plurality of read back signals from a plurality of positions on a disk to which an identical pattern or portion of an identical pattern was written; and a calculator to calculate a timing error based at least in part on the averaged restored digital read back signal.

27. A system of analysis for a read back signal in a magnetic recording device including:

a converter to convert the read back signal to a digital read back signal;

a restorer to restore a low frequency component of the digital read back signal;

a recoverer to recover a sample clock from the restored digital read back signal;

an averager to average the restored digital read back signal using the recovered sample clock, wherein averaging comprises averaging a plurality of read back signals from the same position on a disk obtained on multiple reads; and a calculator to calculate a timing error based at least in part on the averaged restored digital read back signal.

28. A computer program product for analysis of a read back signal in a magnetic recording device, the computer program product being embodied in a computer readable medium and comprising computer instructions for:

converting the read back signal to a digital read back signal;

restoring a low frequency component of the digital read back signal, wherein restoring the low frequency component of the digital read back signal includes detecting a digital read back signal amplitude and multiplying a difference between a signal pattern and a high pass filtered version of the signal pattern by the digital read back signal amplitude;

recovering a sample clock from the restored digital read back signal;

averaging the restored digital read back signal using the recovered sample clock; and calculating a timing error based at least in part on the averaged restored digital read back signal.

29. A computer program product for analysis of a read back signal in a magnetic recording device, the computer program product being embodied in a computer readable medium and comprising computer instructions for:

converting the read back signal to a digital read back signal;

restoring a low frequency component of the digital read back signal, wherein restoring the low frequency component of the digital read back signal includes adding a difference between a signal pattern and a high pass filtered version of the signal pattern multiplied by a digital read back signal amplitude to the digital read back signal;

recovering a sample clock from the restored digital read back signal;

averaging the restored digital read back signal using the recovered sample clock; and calculating a timing error based at least in part on the averaged restored digital read back signal.

30. A computer program product for analysis of a read back signal in a magnetic recording device, the computer program product being embodied in a computer readable medium and comprising computer instructions for:

converting the read back signal to a digital read back signal;

restoring a low frequency component of the digital read back signal;

recovering a sample clock from the restored digital read back signal, wherein recovering a sample clock includes detecting a read back signal edge position in the digital read back signal and using a phase lock loop to lock a sample clock to a plurality of read back signal edge positions to generate a sample clock;

averaging the restored digital read back signal using the recovered sample clock; and calculating a timing error based at least in part on the averaged restored digital read back signal.

31. A computer program product for analysis of a read back signal in a magnetic recording device, the computer program product being embodied in a computer readable medium and comprising computer instructions for:

converting the read back signal to a digital read back signal;

restoring a low frequency component of the digital read back signal;

recovering a sample clock from the restored digital read back signal;

averaging the restored digital read back signal using the recovered sample clock, wherein averaging comprises averaging a plurality of read back signals from a plurality of positions on a disk to which an identical pattern or portion of an identical pattern was written; and calculating a timing error based at least in part on the averaged restored digital read back signal.

32. A computer program product for analysis of a read back signal in a magnetic recording device, the computer program product being embodied in a computer readable medium and comprising computer instructions for:

converting the read back signal to a digital read back signal;

restoring a low frequency component of the digital read back signal;

recovering a sample clock from the restored digital read back signal;

averaging the restored digital read back signal using the recovered sample clock, wherein averaging comprises averaging a plurality of read back signals from the same position on a disk obtained on multiple reads; and calculating a timing error based at least in part on the averaged restored digital read back signal.

* * * * *